Oct. 8, 1968    E. S. GREEN    3,404,822
FEED FINGER
Filed April 20, 1966    2 Sheets-Sheet 2
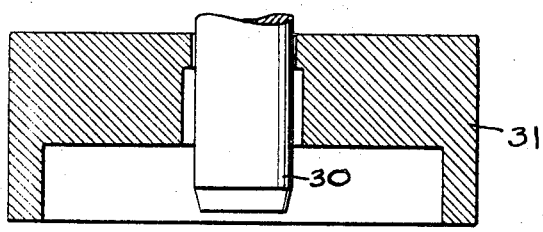
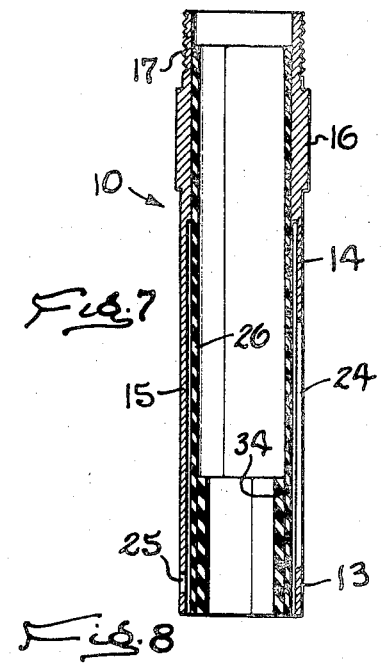
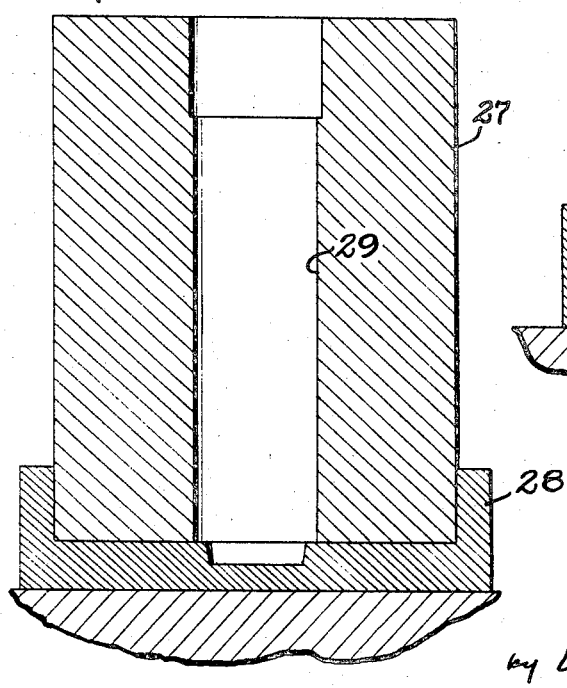
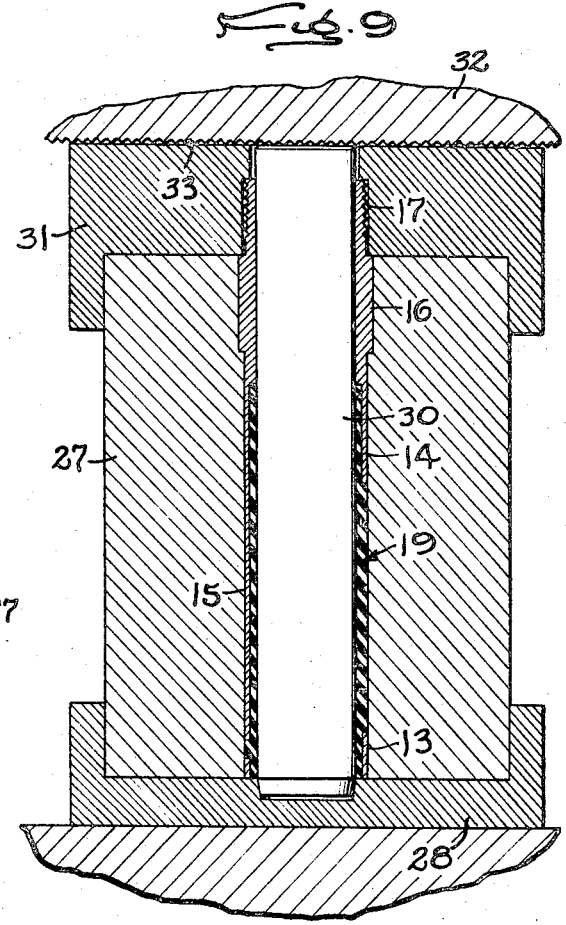
INVENTOR
Edward S. Green
by Wolfe, Hubbard, Voit & Osann
ATTORNEYS United States Patent Office 3,404,822
Patented Oct. 8, 1968

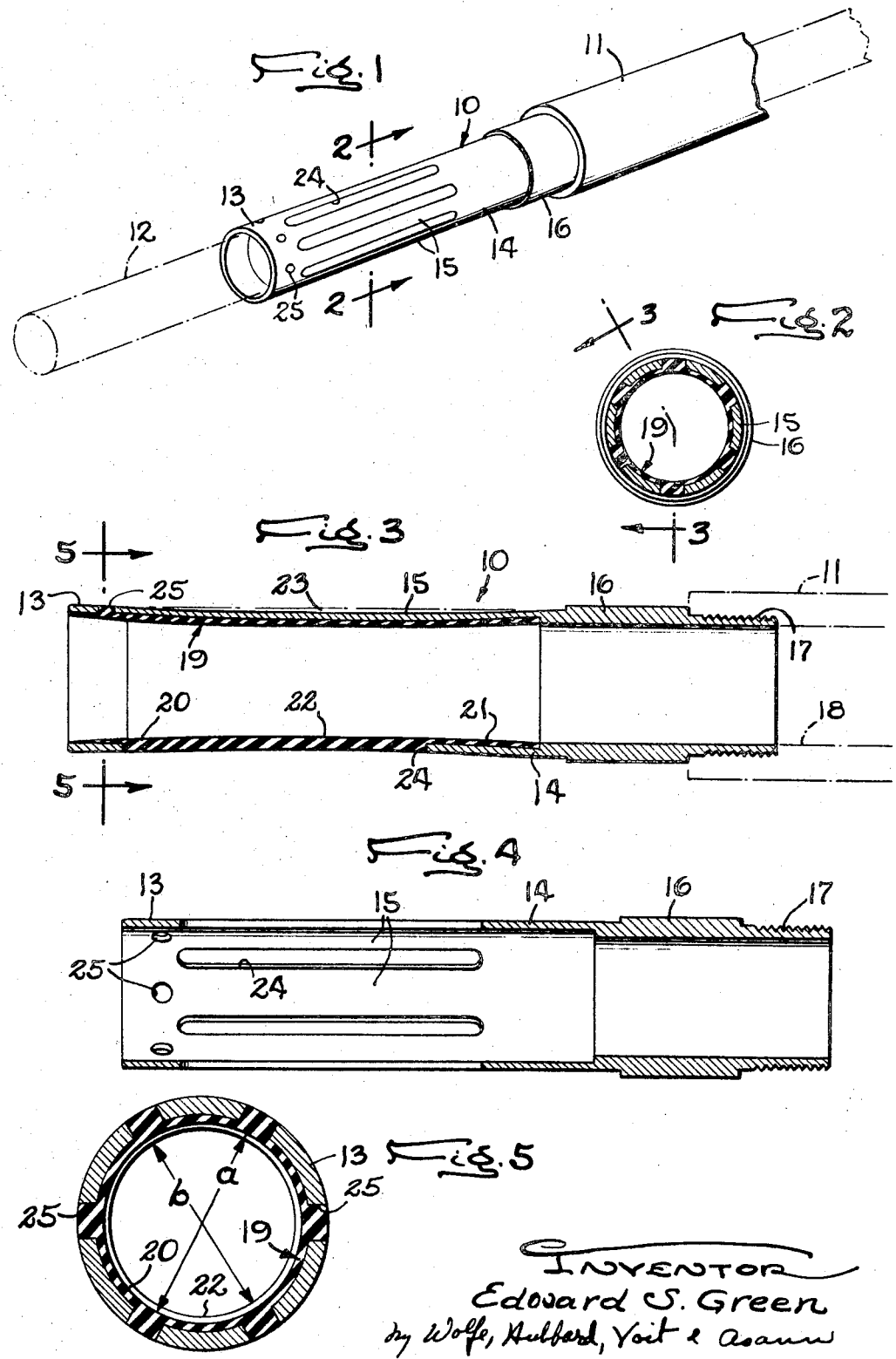

3,404,822
FEED FINGER
Edouard S. Green, Roscoe, Ill., assignor to Green Manufacturing Company, Rockton, Ill., a corporation of Illinois
Filed Apr. 20, 1966, Ser. No. 543,903
7 Claims. (Cl. 226—158)

ABSTRACT OF THE DISCLOSURE

For use with an automatic screw machine for frictionally gripping and advancing a work bar, a feed finger comprises a tubular metal shell formed with a series of angularly spaced and resiliently yieldable strips which are bowed intermediate their ends to apply gripping pressure to the shell. A rubber sleeve telescoped into the bar is contracted by the bowed strips and engages the bar to increase the gripping effectiveness of the strips by distributing the gripping pressure around the periphery of the bar and over a substantial portion of the length of the bar.

---

This invention relates to a so-called feed finger adapted for use with an automatic screw machine for frictionally gripping a work bar and for advancing the same step-by-step in an endwise direction. More particularly, the invention relates to a feed finger comprising a shell which surrounds the bar and which is formed by a pair of axially spaced end rings interconnected by a series of angularly spaced resilient strips for applying the necessary gripping pressure for advancing the bar.

The primary object of the present invention is to provide in a feed finger of the above character a resiliently yieldable sleeve of flowable solid material telescoped into the shell and compressed by the strips for significantly increasing the gripping effectiveness of the strips and for enabling the application of gripping pressure around a substantial portion of the bar periphery and over a substantial portion of the bar length.

A related object is to provide a feed finger in which the yieldable sleeve is bonded to the shell and the resilient strips are bowed inwardly between the end rings to contract the sleeve and to reduce the diameter thereof so that the sleeve yields outwardly to admit the bar and thereafter is compressed by the strips into tight gripping engagement with the surface of the bar.

Other objects and advantages will become apparent from the following detailed description taken in connection with the accompanying drawings, in which—

FIGURE 1 is a perspective view of a feed finger embodying the novel features of the present invention and showing the same attached to the feed tube of an automatic screw machine.

FIG. 2 is an enlarged cross-section taken substantially along the line 2—2 of FIG. 1.

FIG. 3 is a cross-section taken substantially along the line 3—3 of FIG. 2.

FIG. 4 is a view similar to FIG. 3 showing the feed finger without the yieldable sleeve and before the resilient strips are bowed inwardly.

FIG. 5 is an enlarged cross-section taken substantially along the line 5—5 of FIG. 3.

FIG. 6 is a fragmentary cross-section of a platen and mandrel used in the bonding process.

FIG. 7 is a longitudinal cross-section of the feed finger showing the shell and the resilient sleeve before the latter is bonded to the shell.

FIG. 8 is a fragmentary cross-section of a mold used in the bonding process.

FIG. 9 is a fragmentary cross-section showing the finger as the sleeve is being bonded to the shell.

As shown in the drawings for purposes of illustration, the invention is embodied in a feed finger of the type which includes a tubular metal shell 10 mountable on the reciprocable feed tube 11 of an automatic screw machine and telescoped over an elongated bar of stock 12 for advancing the same step-by-step in an endwise direction toward the machine collet (not shown). The shell 10 is formed by a pair of axially spaced and rigid end rings 13 and 14 integral with and interconnected by a series of angularly spaced and resilient metal strips 15 which frictionally grip the bar and advance the latter one step during each forward stroke of the feed tube. To mount the finger on the tube, the shell 10 is formed at one end with an enlarged collar 16 and an external screw thread 17 adapted to mate with an internally threaded bore 18 (FIG. 3) in the feed tube 11.

In accordance with the present invention, a sleeve 19 of resiliently yieldable and flowable solid material, such as firm rubber, is telescoped in and bonded to the shell 10 and is formed with an internal surface which tapers gradually from opposite end portions 20 and 21 (FIG. 3) to a central portion 22 of reduced diameter located intermediate the ends of the strips 15. The reduced central portion 22 of the sleeve flexes radially outwardly to admit the bar 12 and the strips thereafter compress and hold the sleeve in tight gripping engagement with the bar to assure positive feeding of the latter without significant slippage relative to the finger.

In this instance, the resilient strips 15 are bowed inwardly at 23 (FIG. 3), as by hammering or by squeezing, after the sleeve 19 has been bonded to the shell 10 thereby to contract the portion of the sleeve surrounded by the strips and to form the internal surface of the sleeve with a generally convex configuration. Thus, the internal walls of the sleeve gradually converge from the end portion 20 to the circular central portion 22 of reduced diameter disposed within the shortest radii of the bowed strips, and then diverge from the central portion to the opposite end portion 21. Preferably, the internal diameter $a$ (FIG. 5) of the end portions 20 and 21 disposed within the rings 13 and 14 is equal to the outside diameter of the bar 12 while the internal diameter $b$ of the reduced central portion 22 is approximately $\frac{1}{16}$ of an inch less than the diameter of the bar.

As the bar 12 is loaded into the shell 10, it slips easily past the sleeve end portion 21 and then encounters the reduced central portion 22. Further feeding of the bar into the shell causes the sleeve 19 to yield outwardly and causes the strips 15 to flex slightly outwardly relative to the end rings 13 and 14. The flexed strips tend to return to their bowed positions and thus compress the rubber sleeve into secure gripping engagement with the bar. Because of the convex configuration of the sleeve, the pressure exerted by the strips is applied to the bar not only at the reduced central portion 22 but also at areas extending axially to either side of the central portion. In addition, the sleeve grips the bar surfaces disposed between the strips 15 so that the entire circumferential surface of the bar is gripped frictionally when the tube 11 is reciprocated. Since the rubber sleeve 19 is effective to distribute the pressure applied by the strips over a substantial area of the bar surface and since the rubber has a relatively high coefficient of friction, the bar is held very tightly and is fed into the collet with a minimum of slippage.

Herein, the series of resilient strips 15 spanning the end rings 13 and 14 form a plurality of elongated parallel sided slots 24 which are defined by the opposing edges of adjacent strips and by the opposing ends of the rings 13 and 14. When the sleeve 19 is molded into the shell 10, the rubber material flows into and substantially fills the slots thus achieving a secure bond with the interior surfaces of the shell. To strengthen the bond even further, a series of openings or holes 25 are formed in the end ring 13 and are circumferentially staggered relative to the slots 24. These holes also are filled by the rubber material and prevent the sleeve 19 from tearing away from the free end of the shell 10 as the bar 12 is advanced toward the machine collet.

To mold the rubber sleeve 19 into the shell 10, the interior surfaces of the strips 15 and the end rings 13 and 14 first are painted with a suitable bonding liquid. Next, a sheet of rubber 26 (FIG. 7), having a length substantially equal to that of the shell, is rolled into the shape of a cylinder and inserted into the shell. The filled shell then is placed into a mold 27 (FIGS. 8 and 9) which rests on a heated platen 28 and which is formed with a cavity 29 shaped to coincide with the exterior shape of the shell. After a cylindrical mandrel 30 has been telescoped into the rubber and the shell, an upper platen 31 is fitted over the upper portion of the mold. The platens 28 and 31 are heated to a temperature of about 375° F. thereby heating the mold 27 and the mandrel 30 and a press 32 (FIG. 9) is forced tightly against the upper platen and the upper end of the mandrel.

As a result of the applied heat and pressure, the rubber flows into the slots 24 and the holes 25 and becomes firmly bonded to the interior surfaces of the shell 10. During the molding process, the excess rubber flows upwardly between the mandrel 30 and the shell 10 and escapes through a series of serrations 33 formed in the lower surface of the press. To insure that a sufficient amount of rubber is molded into the lower end of the shell, an additional shorter sheet of rubber 34 (FIG. 7) may be telescoped into the lower end of the long sheet 26 before the shell is placed into the mold cavity 29.

After the shell 10 has been heated for about 15 minutes, the mold 27 is allowed to cool and the finger assembly is removed from the mold. Finally, the flash formed in the molding process is trimmed and the resilient strips 15 are bowed inwardly to form the completed finger.

From the foregoing, it will be apparent that by using the yieldable sleeve 19 in conjunction with the resilient strips 15, a more effective gripping force is attained than heretofore possible because the force exerted by the strips is distributed over a substantial area of the bar 12 and by virtue of the fact that rubber inherently possesses a higher coefficient of friction than metal. Moreover, the yieldable gripping surface of the sleeve 19 will not scratch or mar the bar 12 and the service life of the finger is increased since metal to metal contact does not occur.

I claim as my invention:

1. A finger for gripping an elongated bar of stock and feeding it endwise comprising a circumferentially and axially continuous sleeve of resiliently yieldable and flowable solid material, and a tubular shell of resilient metal telescoped over said sleeve and extending along the length of the latter with the sleeve lining the internal surface of the shell and with the internal surface of the sleeve disposed radially inwardly of the internal surface of the shell, said shell comprising a pair of axially spaced and rigid end rings and a series of parallel and angularly spaced resilient strips spanning said rings so as to form a plurality of elongated parallel sided slots, each slot being defined by the opposing ends of said rings and the opposing edges of adjacent strips and being substantially filled by the flowable material of said sleeve, said strips being bowed radially and inwardly to contract a portion of said sleeve between said rings and to reduce the internal diameter of said portion so that said strips and said contracted portion of said sleeve flex radially and outwardly to admit the bar and the strips thereafter compress the sleeve and hold the same in tight gripping engagement with the bar to exert a gripping pressure around the circumference thereof.

2. A feed finger as defined in claim 1 in which the internal surface of said sleeve is tapered gradually from opposite ends to a ciruclar area of reduced diameter disposed opposite and within the shortest radii of said strips.

3. A feed finger as defined in claim 2 in which the material of said sleeve is molded within said shell so as to fill said slots and become bonded securely to the internal surfaces of said strips and said end rings.

4. A feed finger as defined in claim 1 in which said shell comprises an integral metal tube longitudinally slotted to form said elongated strips spanning said end rings.

5. A finger for gripping an elongated bar of stock and feeding it endwise comprising a sleeve of resiliently yieldable and flowable solid material, and a tubular shell of metal telescoped over said sleeve and extending along the length of the latter with the internal surface of said sleeve disposed radially inwardly of the internal surface of said shell, said shell comprising a pair of axially spaced end rings and a series of parallel and angularly spaced resilient strips spanning said end rings so as to form a plurality of elongated parallel sided slots, each slot being defined by the opposing ends of said rings and the opposing edges of adjacent strips and being substantially filled by the flowable material of said sleeve, the internal diameter of said sleeve gradually diminishing from one end portion thereof to a point intermediate the ends of said strips and then gradually increasing from said point to the other end portion so that the internal configuration of said sleeve is convex whereby the portion of said sleeve having the smaller diameter flexes radially outwardly to admit the bar and thereafter is compressed by said strips into tight gripping engagement with the bar to exert a gripping pressure around the circumference thereof.

6. A feed finger as defined in claim 5 in which said strips are bowed radially and inwardly to contract said sleeve and form the convex configuration thereof.

7. A feed finger as defined in claim 5 in which a series of angularly spaced openings are formed in one of said end rings, said openings being axially alined with said strips and circumferentially staggered relative to said slots, the material of said sleeve being molded within said shell so as to fill said slots and said openings and become bonded securely to the internal surfaces of said strips and said end rings.

References Cited

UNITED STATES PATENTS 2,680,623   6/1954   Hasselblad _____ 279—46
2,829,899   4/1958   Drew _____ 279—41

M. HENSON WOOD, JR., *Primary Examiner.*

R. A. SCHACHER, *Assistant Examiner.*